Feb. 9, 1954
T. D. HOBBS
2,668,485
SYNCHRONIZED LIGHT AND CAMERA SHUTTER SYSTEM
Filed Nov. 9, 1951
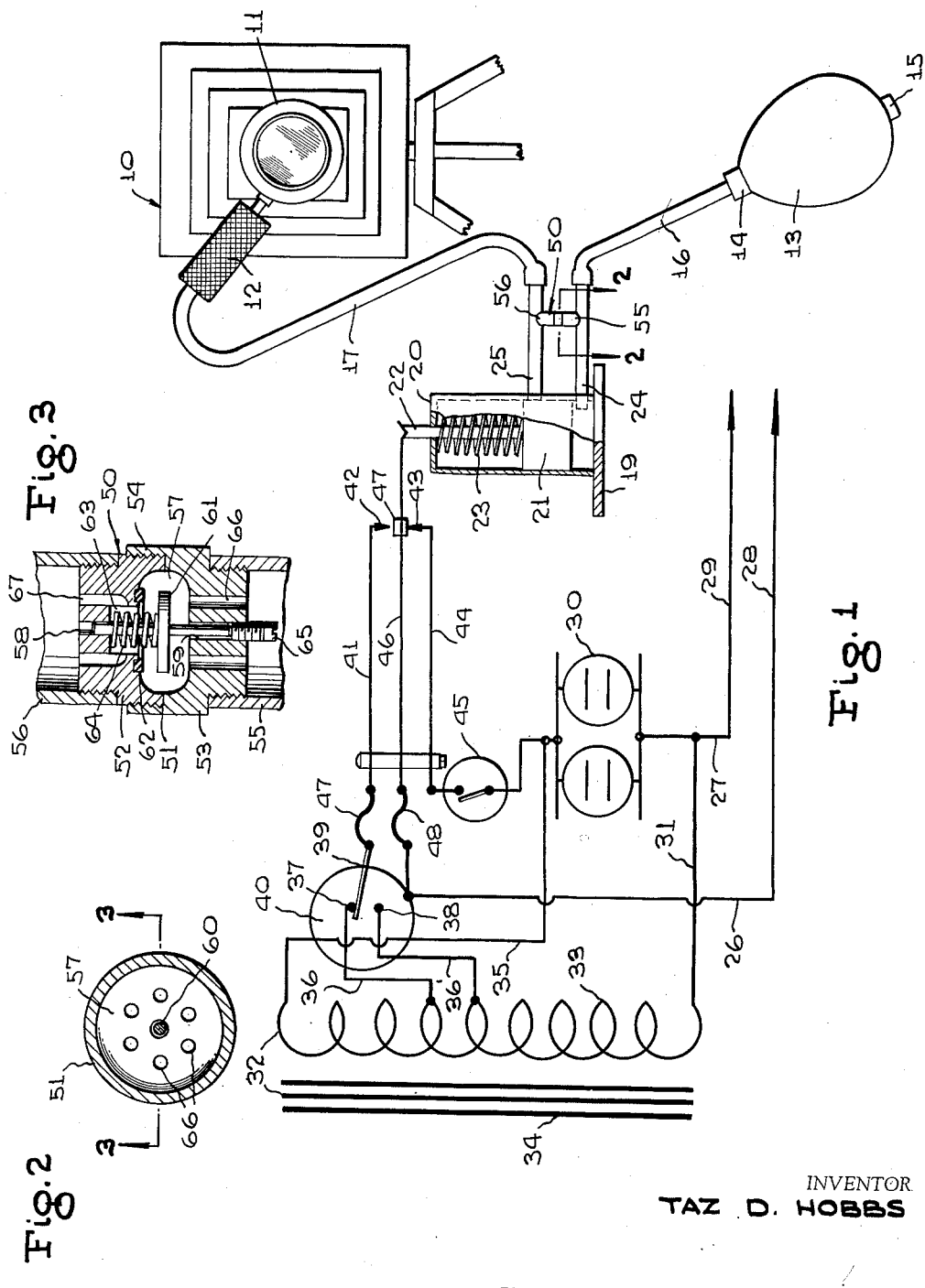
INVENTOR.
TAZ D. HOBBS
BY
McMorrow, Berman & Davidson
ATTORNEYS Patented Feb. 9, 1954

2,668,485

UNITED STATES PATENT OFFICE 2,668,485

SYNCHRONIZED LIGHT AND CAMERA
SHUTTER SYSTEM

Taz D. Hobbs, Alvin, Tex.

Application November 9, 1951, Serial No. 255,579

4 Claims. (Cl. 95—11.5)

This invention relates to a synchronized light source and camera shutter system and more particularly to a system wherein the light source is maintained at a low intensity for modeling and focusing and its intensity is increased simultaneously with the opening of the camera shutter to expose a film or plate.

It is among the objects of the invention to provide an improved light source and camera shutter system wherein the light may be manually lighted at a low intensity and maintained lighted at a low intensity for focusing and modeling and changed to operation at a higher intensity by opening operation of the shutter operating mechanism for opening the shutter; wherein the camera shutter can be opened for focusing and modeling and subsequently closed without changing the intensity of the light source; and wherein the intensity of the light source can be selectively varied.

Other objects and advantages will become apparent from a consideration of the following description and the appended claims in conjunction with the accompanying drawing wherein:

Figure 1 is a somewhat diagrammatic illustration of a synchronized light and camera shutter system illustrative of the invention;

Figure 2 is a transverse cross sectional view on an enlarged scale on the line 2—2 of Figure 1; and Figure 3 is a longitudinal cross sectional view on the line 3—3 of Figure 2.

With continued reference to the drawing, the numeral 10 generally indicates a camera, the camera illustrated being of the type generally used in photographic studios for making portraits and similar pictures. This type of camera is usually provided with a lens and shutter assembly 11 and with a pneumatic shutter actuating device 12 mounted on the assembly 11 and operatively connected to the shutter to open and close the shutter.

A hand bulb 13 is provided for operating the shutter and is provided with apertured bosses 14 and 15 disposed one at each end thereof. A tube 16 of flexible material is connected at one end to the bulb 13 through the boss 14 and a tube 17 of flexible material is connected at one end to the shutter opening device 12. The tubes 16 and 17 are connected for communication with each other through the pneumatic operator of a light source controlling switch, so that the light source for the camera is operated synchronously with the opening of the camera shutter.

The illustrated light source controlling means comprises a pneumatic switch operator comprising a cylinder 18 mounted on a fixed base 19 which closes one end of the cylinder, the other end thereof being closed by a centrally apertured end wall 20. A piston 21 is slidably mounted in the cylinder and a piston rod 22 extends from the piston through the central aperture in the cylinder end wall 20. A helical expanding spring 23 surrounds the piston rod 22 and is compressed between the end wall 20 and the piston 21 and resiliently urges the piston toward the cylinder base 19.

The cylinder 18 is provided with ports spaced apart longitudinally thereof and disposed one near the base 19 and the other spaced from the one nearest the base by a distance somewhat less than the thickness of the piston 21, as is clearly illustrated in Figure 1. A conduit 24 is connected at one end to the cylinder port nearest the base 19 and is connected at its other end to the flexible tube 16 leading from the hand bulb 13, and a conduit 25 is connected at one end to the cylinder port remote from the base 19 and is connected at its other end to the flexible tube 17.

With this arrangement, when the hand bulb is squeezed, air is forced through the flexible tube 16 and the conduit 24 into the space within the cylinder 18 between the base 19 and the adjacent end of the piston 21 so that the piston is forced away from the base 19 until the port to which the conduit 25 is connected is uncovered by the piston, whereupon the air will flow from the interior of the cylinder through the conduit 25 and tube 17 to the shutter opening device 12 for opening the camera shutter.

A light source is provided for operation synchronously with the opening of the camera shutter and includes a pair of conductors 26 and 27 which may constitute the two wires of a two-wire extension cord arranged to be connected to the two wires 28 and 29 respectively, of a two-wire power line. The wire 27 is connected at one end to one side of a lamp unit 30 which includes one or more lamp bulb sockets and suitable floodlight lamp bulbs mounted one in each of the sockets. These lamp bulbs are of a type capable of producing light of different intensities when energized by electric current at different voltages. The wire 27 is also connected by a wire 31 with one end of the winding 33 of an auto-transformer 32 which includes a core 34. The other end of the winding 33 of the auto-transformer is connected by a wire 35 to the other side of the lamp unit 30.

Taps 36 and 36' are taken off of the transformer winding 33 at spaced apart locations therealong and are connected to switch points or contacts 37 and 38, respectively. An arm or contactor 39 of a manually operated switch 40 is selectively engageable with the points or contacts 37 and 38 to selectively connect the taps 36 or 36' to a wire 41. The wire 41 leads to a fixed switch point 42 of a relay switch operated by the pneumatic operator described hereinafter. Another point or contact 43 is opposed to the contact 42 and is connected through a wire 44 and a manually operated switch 45 to the wire 35 which leads to the side of the lamp unit 30 opposite that to which the line wire 29 is connected by the wire 27.

A resilient switch arm or contactor 46 carries a double contact 47 disposed between the opposed fixed contacts 42 and 43 and is connected at one end to the wire 26 which is connected to the power line wire 28. At its other end the resilient switch arm 46 perpendicularly abuts the outer end of the piston rod 22. Fuses 47 and 48 are connected between the arm 39 of the manual switch 40 and the conductor 41 and between the wire 26 and the resilient switch arm 46, respectively.

The double contact 47 of the resilient switch arm 46 is normally in engagement with the fixed contact 43 which is connected through the wire 44 and switch 45 to one side of the lamp unit 30. When the manually operated switch 45 is closed, a circuit is established from the power line wire 28 through the wire 26, the fuse 48, the resilient switch arm 46, the contact 43, the wire 44, and the manually operated switch 45 through the lamp unit 30, and the wire 27 to the other power line 29, so that the power lines are connected to the lamp unit and shunt the transformer winding 33 so as to energize the lamp unit at a low line voltage and at a low light intensity.

When the bulb 13 is squeezed and piston 21 is forced away from the base plate 19 by air from the hand bulb 13, the resilient switch arm 46 is moved, so that the double contact 47 is disengaged from the contact 43 and brought into engagement with the contact 42. This establishes a circuit from the line wire 29 through the wire 31 to one end of the transformer winding 33 and therethrough to one of the taps 36 or 36', depending upon the position of the arm 39 of the switch 40, through the fuse 47, the wire 41, the contacts 42 and 47, the wire 46, the fuse 48 and the wire 26, to the power line wire 28, and from the other end of the transformer winding through the wire 35 to one side of the lamp unit 30, and from the other side of the lamp unit 30 through the wire 27 to the power line 29, so that the lamp unit 30 is energized by the transformer and is operated at a higher voltage and produces light of higher intensity. Variation of this range of higher intensity can be made by operating the manual switch 40 so as to selectively engage the switch contacts 37 and 38 and thereby boring into the circuit greater or lesser portions of the transformer winding 33.

With the manual switch 45 open illumination of the lamp unit 30 does not take place unless and until the switch arm contact 47 is engaged with the contact 42 by squeezing the bulb 13 for producing high intensity illumination. This arrangement provides a flash operation of the lamp unit 30 which is particularly useful in photographing certain subjects, such as infants, where employment of low intensity illumination for the time necessary for posing may cause discomfort.

Certain commercial camera shutters are constructed so that a gentle pressure on the hand bulb will open the shutter and latch the shutter in open position for focusing the camera and posing or modeling the subject, and so that a release of the compressed hand bulb with the air inlet boss 15 at the other end of the bulb closed will create a suction in the shutter actuating device 12 and close the shutter. These shutters are also arranged so that a quick or hard compression of the hand bulb will sequentially open and close the shutter during an elapsed interval of time selected by the photographer.

In order to provide for application of the synchronized light and shutter control system of the present invention to shutters of the type described above, a by-pass check valve, generally designated 50 and illustrated in Figures 2 and 3, is provided and is connected between the conduits 24 and 25 to which the flexible tubes 16 and 17 are connected.

The by-pass check valve 50 may conveniently comprise a cylindrical body 51 preferably formed in two separable sections 52 and 53 for convenience in manufacturing and assembly, the sections being interconnected by a screw thread connection 54. Fittings 55 and 56 are provided on the conduits 24 and 25, respectively, which project perpendicularly each from its associated conduit toward the other conduit. These fittings receive the screw threaded end portions of the body 51 to secure the check valve in position between the conduits 24 and 25 and in communication with both of these conduits.

The body 51 is provided intermediate its length with an internal chamber 57 and with coaxial bores 58 and 59 extending one from each end of the body to the adjacent sides of the chamber. A valve stem 60 is slidably mounted in the bores 58 and 59 and a valve disc 61 is mounted on the stem within the chamber 57. A gasket 62 is mounted in a groove in the body at one side of the chamber 57 and cooperates with the disc 61 to provide an air seal. A counterbore 63 is provided at the inner end of the bore 58 and an expanding helical spring 64 surrounds the valve stem 60 between the valve disc 61 and the inner end of the counterbore 63 and resiliently urges the valve disc away from the gasket 62 to the open position illustrated in Figure 3, in which the disc is spaced from the gasket 62. The open position of the disc on the chamber is determined by a set screw 65 threaded into the outer end of the bore 59 and bearing against the adjacent end of the valve stem 60.

A plurality of circumferentially spaced air passages 66 extend through the body from the end of the body carrying the set screw 65 to the chamber 57 and are concentrically spaced from the bore 59, as illustrated in Figure 2. Other circumferentially spaced air passages 67 extend from the counterbore 63 to the adjacent end of the body 51 and are concentrically spaced around the bore 58.

With this arrangement, when the hand bulb 13 is gently pressed, air flows through the air passages 66, the chamber 57 and the air passages 67 from the conduit 24 to the conduit 25 and does not close the check valve against the resistance of spring 64, and the spring 23 of the pneumatic switch operator holds the piston in its initial or normal position adjacent to the base plate 19. When the hand bulb is quickly compressed, the rush of air through the passages 66 and against the valve disc 61 moves this valve disc against the resistance of spring 64 into engagement with the gasket 62 and closes the check valve, so that air cannot pass through the check valve from the conduit 24 to the conduit 25. As a result, air at sufficiently high pressure is applied to the piston 21 of the operator to move the piston far enough away from the base plate 19 to uncover the conduit 25 and establish communication between the conduit 24 and the conduit 25 through the interior of the cylinder 18, so that air under pressure is applied to the shutter operating device 12 and the camera shutter is opened and closed in rapid succession. The described movement of the piston 21 simultaneously moves the double contact 47 away from the contact 43 into engagement with the contact 42 so that the intensity of illumination of the lamp unit 30 is increased to the high range during the time that the camera shutter is open.

While the circuit has been illustrated in the accompanying drawing and hereinabove described as including an auto-transformer, it is to be understood that the synchronizing portion of the circuit may be used in various electrical circuits which may or may not include an auto-transformer.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a synchronized light source and shutter operating system for a camera, a shutter operating device adapted to be operatively connected to a camera shutter, pneumatic means including a bulb, conduit means operatively connecting said bulb to said device for operating said device whenever the bulb is compressed, a pneumatic switch operator including a cylinder, a piston working in the cylinder, means acting between the cylinder and the piston and urging the piston toward an initial position, said conduit means being effectively connected in communication with the interior of said cylinder and including a first conduit occluded by said piston in its initial position, a lamp unit, a lamp unit controlling switch including an arm and a pair of contacts at opposite sides of said arm, said arm being biased to normally engage one of said contacts and be disengaged from the other contact, means operatively connecting said piston with said switch arm, said piston being arranged to be moved away from its initial position by compression of said bulb to a displaced position so as to move said switch arm away from said one contact and into engagement with the said other contact, the movement of the piston from initial to displaced position serving to open said first conduit to the interior of said cylinder resulting in communication between said first and second conduits through the cylinder and operation of said shutter operating device, said lamp unit having a first side adapted to be connected to a side of a power line, said lamp unit having another side connected to said one contact of said controlling switch, an auto-transformer having a winding connected at one end to said first side of the lamp unit and connected at its other end to the second side of the lamp unit, and at least one tap leading from the transformer winding at a point between the ends thereof, said tap being connected to said other contact of the controlling switch, and a conductor leading from said controlling switch arm for connection to the remaining side of the power line.

2. In a synchronized light source and shutter operating system for a camera, a shutter operating device adapted to be operatively connected to a camera shutter, pneumatic means including a bulb, conduit means operatively connecting said bulb to said device for operating said device whenever the bulb is compressed, a pneumatic switch operator including a cylinder, a piston working in the cylinder, means acting between the cylinder and the piston and urging the piston toward an initial position, said conduit means being effectively connected in communication with the interior of said cylinder and including a first conduit occluded by said piston in its initial position, a lamp unit, a lamp unit controlling switch including an arm and a pair of contacts at opposite sides of said arm, said arm being biased to normally engage one of said contacts and be disengaged from the other contact, means operatively connecting said piston with said switch arm, said piston being arranged to be moved away from its initial position by compression of said bulb to a displaced position so as to move said switch arm away from said one contact and into engagement with the said other contact, the movement of the piston from initial to displaced position serving to open said first conduit to the interior of said cylinder resulting in communication between said first and second conduits through the cylinder and operation of said shutter operating device, said lamp unit having a first side adapted to be connected to a side of a power line, said lamp unit having another side connected to said one contact of said controlling switch, an auto-transformer having a winding connected at one end to said first side of the lamp unit and connected at its other end to the second side of the lamp unit, and at least one tap leading from the transformer winding at a point between the ends thereof, said tap being connected to said other contact of the controlling switch, and a conductor leading from said controlling switch arm for connection to the remaining side of the power line, and another tap leading from the transformer winding at a point between the first-mentioned tap and the adjacent end of the winding, and a manual switch having contacts to which the taps are connected and a manually movable arm engageable with either of the manual switch contacts, the arm of the manual switch being connected to the arm of the controlling switch and serving with as a connection between the first-mentioned tap and said other contact of the controlling switch when the arm of the manual switch is engaged with the contact thereof to which the first-mentioned tap is connected.

3. In a synchronized light source and shutter operating system for a camera, a shutter operating device adapted to be operatively connected to a camera shutter, pneumatic means including a bulb, conduit means operatively connecting said bulb to said device for operating said device whenever the bulb is compressed, a pneumatic switch operator including a cylinder, a piston working in the cylinder, means acting between the cylinder and the piston and urging the piston toward an initial position, said conduit means being effectively connected in communication with the interior of said cylinder and including a first conduit occluded by said piston in its initial position, a lamp unit, a lamp unit controlling switch including an arm and a pair of contacts at opposite sides of said arm, said arm being biased to normally engage one of said contacts and be disengaged from the other contact, means operatively connecting said piston with said switch arm, said piston being arranged to be moved away from its initial position by compression of said bulb to a displaced position so as to move said switch arm away from said one contact and into engagement with the said other contact, the movement of the piston from initial to displaced position serving to open said first conduit to the interior of said cylinder resulting in communication between said first and second conduits through the cylinder and operation of said shutter operating device, said lamp unit having a first side adapted to be connected to a side of a power line, said lamp unit having another side connected to said one contact of said controlling switch, an auto-transformer having a winding connected at one end to said first side of the lamp unit and connected at its other end to the second side of the lamp unit, and at least one tap leading from the transformer winding at a point between the ends thereof, said tap being connected to said other contact of the controlling switch, and a conductor leading from said controlling switch arm for connection to the remaining side of the power line, and means connecting said one contact of the controlling switch to said other side of the lamp unit comprising a hand switch arranged to be opened to prevent energization of the lamp unit unless and until the arm of the controlling switch has been operated out of engagement with said one contact and into engagement with said other contact of the controlling switch and to be closed to energize the lamp unit before the arm of the controlling switch has been operated out of engagement with said one contact and into engagement with said other contact of the controlling switch while said first side of the lamp unit and said conductor are connected to power lines.

4. In a synchronized light source and shutter operating system for a camera, a shutter operating device adapted to be operatively connected to a camera shutter, pneumatic means including a bulb, conduit means operatively connecting said bulb to said device for operating said device whenever the bulb is compressed, a pneumatic switch operator including a cylinder, a piston working in the cylinder, means acting between the cylinder and the piston and urging the piston toward an initial position, said conduit means being effectively connected in communication with the interior of said cylinder and including a first conduit occluded by said piston in its initial position, a lamp unit, a lamp unit controlling switch including an arm and a pair of contacts at opposite sides of said arm, said arm being biased to normally engage one of said contacts and be disengaged from the other contact, means operatively connecting said piston with said switch arm, said piston being arranged to be moved away from its initial position by compression of said bulb to a displaced position so as to move said switch arm away from said one contact and into engagement with the said other contact, the movement of the piston from initial to displaced position serving to open said first conduit to the interior of said cylinder resulting in communication between said first and second conduits through the cylinder and operation of said shutter operating device, said lamp unit having a first side adapted to be connected to a side of a power line, said lamp unit having another side connected to said one contact of said controlling switch, an auto-transformer having a winding connected at one end to said first side of the lamp unit and connected at its other end to the second side of the lamp unit, and at least one tap leading from the transformer winding at a point between the ends thereof, said tap being connected to said other contact of the controlling switch, and a conductor leading from said controlling switch arm for connection to the remaining side of the power line, said first and second conduits having a by-pass check valve connected therebetween outside of said cylinder, said valve comprising a body having open ends communicating severally with the conduits, a spring pressed normally open valve member within said body between said ends, and a valve seat within said body between one of said ends and said valve member, said valve member being arranged to be moved against the resistance of its spring to engagement with said valve seat to close one of said open ends whenever sufficiently high air pressure is produced in compressing said bulb, light compression of the bulb producing insufficient air pressure to move the valve member into engagement with the valve seat and an open position of the valve member permitting air pressure to by-pass said cylinder through the conduits and permit said piston to remain in its initial position, heavy compression of the bulb producing sufficient air pressure to move said valve member into engagement of the valve seat whereby sufficient air pressure enters said cylinder to move said piston from its initial to its displaced position.

TAZ D. HOBBS.

References Cited in the file of this patent
UNITED STATES PATENTS

| Number | Name | Date |
| --- | --- | --- |
| 1,088,695 | Goldensky et al. | Mar. 13, 1940 |
| 1,988,022 | Smith | Jan. 15, 1935 |
| 2,039,193 | Schwarz | Apr. 28, 1936 |